United States Patent [19]

Lamy

[11] 3,938,343

[45] Feb. 17, 1976

[54] PLATFORM STRUCTURE FOR MARITIME INSTALLATION

[75] Inventor: Jacques Edouard Lamy, Fontenay-aux-Roses, France

[73] Assignee: C. G. Doris, Paris, France

[22] Filed: Nov. 5, 1974

[21] Appl. No.: 521,075

[30] Foreign Application Priority Data
Nov. 13, 1973 France .......................... 73.40272
May 20, 1974 France .......................... 74.17478

[52] U.S. Cl. ................ 61/46.5; 61/4; 61/72.3; 49/68
[51] Int. Cl.² .................. E02B 17/00; E02B 3/04
[58] Field of Search .......... 61/46.5, 46, 72.3, 69 R, 61/69 A; 49/68

[56] References Cited
UNITED STATES PATENTS

| | | | |
|---|---|---|---|
| 2,335,450 | 11/1943 | Sandberg | 49/68 |
| 2,919,552 | 1/1960 | Hayward | 61/46.5 |
| 2,960,832 | 11/1960 | Hayward | 61/46.5 |
| 3,029,608 | 4/1962 | Perkins | 61/46.5 |
| 3,380,256 | 4/1968 | Rebikoff | 61/46.5 |
| 3,522,709 | 8/1970 | Vilain | 61/46.5 |
| 3,640,079 | 2/1972 | Theriesen et al. | 61/69 A |
| 3,678,624 | 7/1972 | Bicicchi | 49/68 |
| 3,744,258 | 7/1973 | Lochridge | 61/72.3 |
| 3,830,068 | 8/1974 | Peter | 61/46 |

*Primary Examiner*—Jacob Shapiro
*Attorney, Agent, or Firm*—Wigman & Cohen

[57] ABSTRACT

A platform structure for maritime installations, designed to rest under its own weight upon the seabed through the medium of a base acting as the foot of a tower surmounted by an emergent superstructure, comprising a strong, watertight tubular member incorporated into the structure in order to form a shaft or chimney extending from top to bottom of the structure in order to protect the components of the installation against corrosion and shock loading, and in order also to make it possible to carry out in the dry the various operations required by the process. The tubular member can be used without a base in order to give direct access to the seabed. Preferentially, the tubular member will communicate with one or more radial, watertight tunnels formed in the base.

21 Claims, 11 Drawing Figures

PLATFORM STRUCTURE FOR MARITIME INSTALLATION

The present invention relates to a platform for offshore operations, designed to carry industrial installations such as drill rigs or petroleum production plants, power stations (electrical or other types) or scientific installations for example for oceanography or meteorological purposes. The invention relates more particularly to a platform of the so-called "gravity platform" type which rests upon the sea bed through the medium of a heavy base forming the foot of a tower surmounted by a superstructure emerging above the water.

This platform is made of prestressed reinforced concrete, being built partially on land and partially at sea at a sheltered location of adequate depth. After the completion and assembly of the equipment, the platform is towed to its final site of erection where it is submerged so that it rests upon the sea bed heavily, if required being ballasted down by the use of gravel or the like.

In accordance with the present invention, the platform structure incorporates a strong, watertight tubular member which does duty as a shaft extending from top to bottom of the structure and which can be kept dry, the shaft being designed to protect the piping arrangements, machinery or other essential elements of the installation, so that they are not affected by marine corrosion and are also protected against shock loading, this system furthermore making it possible to carry out various maintenance, inspection and other operations etc.., required by the process for which the platform is being used, in the dry.

In one embodiment, the strong (i.e. pressure-resisting), watertight shaft has no bottom so that, when it is kept dry it can provide direct access, without involving any immersion, to the sea bed through the base. In another embodiment, if there is no requirement for access to the sea bed, the barrel can be closed off at the bottom.

In accordance with an advantageous feature of the present invention, the strong barrel, which preferably occupies a central position in said structure and is therefore protected by the external parts thereof, will communicate with one or more radial, watertight tunnels located at a deep level, for example in said base in proximity of the sea bed, which can also be kept dry. If the shaft is closed off at the bottom, it gives direct access, in the dry, to the radial tunnels, without any need to adopt any special precautions in order to dry out said tunnels or prevent water penetrating into them.

If the strong shaft is without a bottom, it can be provided at its bottom part with an anchoring pile, sliding in telescopic fashion and designed to penetrate into the sea bed, said pile being for example tubular in form and of watertight design, so that the shaft is effectively extended downwards by a kind of casing or tubbing device, down to an impermeable stratum of the sea bed.

As indicated above, one of the essential objectives of the present invention is that in accordance with which, by arranging in the central shaft and/or in the tunnels, the vital but generally vulnerable elements concerned with the process which is to be operated: for example the drill pipes, the gas or petroleum lines, they are protected against damage due to corrosion or shock.

The central shaft will furthermore be designed to withstand the kind of accidental damage which could occur to these elements, so that they are substantially more effectively protected than in conventional installations. In particular, the failure of a gas line inside the shaft, will simply result in a gas leak, without any fire; any combustion which did take place, would be burnt off at a very high level, beyond the top end of the shaft. The prevention of a runaway fire, due to the escape of gas, or a maritime installation, is a vital requirement.

The tunnels connected to the central shaft make it possible to connect the submarine pipelines with the lines inside the platform, by operations carried out in the dry, whereas this kind of connection function is normally performed under water under very difficult working conditions, by divers or by using tools which as far as operations at depths of more than 80 meters of water, are still in the drawing board stage.

The existence of the dry shaft extending right down to the sea bed, and its extension by a watertight casing device down to the impermeable layer of the seabed substratum, make it possible to pass petroleum extraction lines more easily.

It is also possible, because of the dimensions of the shaft and when the latter has no bottom, to sink shafts of the mining kind, employing cage hoists and systems for the ventilation of the mine galleries.

The description which now follows in relation to the attached drawings, given purely by way of non-limitative example, will define the advantages of the invention and the method by which the latter is performed.

FIG. 1 is an overall perspective view, partially cut away, of an embodiment of a platform structure in accordance with the present invention.

FIG. 2 is a vertical schematic section taken on the line II—II of FIG. 3.

FIGS. 3 and 4 are respective transverse schematic sections on the lines III—III and IV—IV of FIG. 2.

FIG. 6 is a partial schematic view on a larger scale, illustrating a detail.

FIG. 7 illustrates another embodiment of a platform structure in accordance with the present invention, seen in schematic vertical section on the line VII—VII of FIG. 8.

FIGS. 8 and 9 are sectional views on the lines VIII—VIII and IX—IX respectively of FIG. 7.

FIG. 10 is a vertical section on a larger scale, through the bottom part of the structure.

The structure of the platform shown in FIGS. 1–4, comprises, working from the bottom upwards:

an apron or base 1 designed to carry the assembly and to transmit to the seabed S the loads which are due to the dead weight of the structure and to the forces produced by the elements (swell, current, wind);

a cylindrical body 2, for example of lobed hexagonal shape, integrally connected to the apron 1 and rising to a level higher than the level N of the sea;

a hollow central shaft 3 which, also rising from the base of the apron 1, extends up to the decks 5 of the emergent superstructure;

columns 4 which, supported upon the periphery of the cylindrical body 2, cooperate with the central hollow shaft 3 in order to support the decks 5;

tunnels 6 arranged in the apron 1 and radiating from the central hollow shaft 3.

The apron 1 comprises:

at the bottom a slab 8 in order to transmit to the seabed S the vertical loads occurring, said slab being equipped with webs in the form of the beams 9 which are carried on buttresses 11, and exhibiting a raised central portion 10 stiffened by beams 12;

at its circumference a circular perforated wall 7 whose purpose is to stiffen the slab 8 and to prevent undermining of the seabed S around the structure, by virtue of the perforations 16, this in the manner described in U.S. Pat. application Ser. No. 391,465, filed Aug. 24, 1973 now U.S. Pat. No. 3,878,684;

at its centre, the lobed wall 13 of the cylindrical body 2, and diaphragms 14 linking the intersections 15 between the lobes 13, with a central chamber 17 formed at the bottom of the central hollow shaft 3;

the tunnels 6 attached to the slab 8 and passing through the beams 12 and 9 as well as the lobed wall 13, to terminate at the external wall 7 where they open out through openings which are closed off in watertight fashion;

between the intersections 15 between the lobes 13 and the external wall 7, large buttresses 11 which perform integral connection of the central body 2 to the apron.

It should be noted that the central part 10 of the slab 8 does not rest on the seabed S, this with the object of increasing the compressive stress developed in the seabed. The seabed is thus in compression over the whole area of its contact with the apron 1, this even where a strong toppling couple is applied to the structure by the action of the elements. Thus, there is no risk of any lifting.

Figure 4:
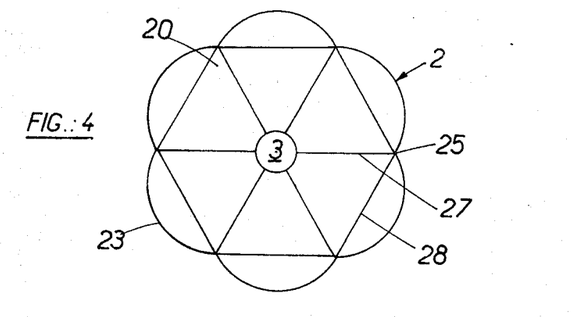

The design of the cylindrical body 2 has already been described insofar as its portions integrally connected to the apron 1 are concerned. As far as the remaining part is concerned, this simply comprises the central hollow shaft 3 connected to the intersections 15 of the lobed hexagonal wall 13, by diaphragms 14 terminating inwardly in segments 18 for attachment to the central shaft 3. The assembly of these vertical walls is partitioned at a certain height by a watertight horizontal slab 20 extending between the lobed wall 13 and the central hollow shaft 3, and stiffened by beams 21 which are carried on the diaphragms 14.

Above the level of this slab 20, the lobed wall 13 continues for a height extending above the level of the sea N, in the form of a wall 23 which is also lobed and perforated by holes 24. At the intersections 25 between these lobes, vertical beams 26 are arranged which are fixed at the bottom to the diaphragms 14 and the slab 20, and which at the top are carried on the central hollow shaft 3 through the medium of radial bars 27. Beams 28 link together the intersections 25 between the of wall 23, forming in this way a hexagon which, in cooperation with the bars 27, triangulates the top of the wall 23 so that it cannot distort.

The superstructure comprises decks 5 with one or more levels, located well above the level N of the sea, and always out of the water even with the highest of waves. The decks 5 are supported at the periphery on the columns 4 placed on the top 29 of the perforated, lobed wall 23 and are supported centrally on the central hollow shaft 3 which can pass beyond the level of the decks to act as a chimney, this in particular where it is natural gas which is being handled, the objective being to ensure safety in the event that fire should break out.

The platform is designed primarily for drilling undersea petroleum wells, for bringing these wells into production and for the installation of power stations at sea which burn either crude petroleum or gas, produced on the spot. In the case of drilling and production installations, either for gas or petroleum, the platform should incorporate extensions of the lines and well casing tubes. These extensions are constituted by an assembly of concentric tubes protected by a so-called external guide tube. Each well thus comprises a varying number of concentric tubes arranged in a large-sized guide tube (it has a diameter between 600 and 900 millimeters, sometimes more).

Since drilling platforms are very expensive, a single platform is used for drilling a large number of wells from the same point, by the so-called deflected well drilling method.

In the case of conventional steel platforms, the well guide tubes are grouped in a bunch and descend from the deck of the platform down to the seabed, being fixed at regular intervals to the platform cross-members. The bunch of tubes is subjected to the action of swell, wind and currents; it also experiences sea water corrosion.

If the structure is involved in a collision, the tubes may be damaged with possibly very serious consequences (eruption of the wells, fire on the platform).

The product oil or gas is subsequently discharged through other lines which, descending from the bridge of the platform, are connected to the pipelines placed on the seabed, for transfer towards dry land, to reservoirs in the oil field, or to loading buoys (where oil tankers, gas tankers and the like can be loaded). For reasons of facility of construction, these lines establishing connection with other platforms, are arranged along piers. Thus, more than the other lines, they are open to the risk of damage by accidental bumps and shocks from ships.

The platform described, with its central hollow shaft 3 having no bottom, and its submarine tunnels 6, presents the following technical features:

the bunch of guide tubes containing the drill pipe extensions, is arranged in the central hollow shaft 3 which is kept dry by means of the system used to seal the bottom (this system will be described hereinafter), and, if required, by a low-rate pumping operation;

the product input or output lines, also descend down to the bottom of the shaft through said same central shaft 3, and then leave radially through the tunnels 6 which are also kept dry by a tunnel exit sealing device which will be described hereinafter.

The assembly of connecting lines from the platform, is thus kept dry and protected against accidental shocks by virtue of the double protection afforded by the perforated wall 23 of the cylindrical body 2 and by the strong wall of the central hollow barrel 3. These connections are therefore not exposed to corrosion and can be inspected and maintained permanently, thus much reducing the risk of accident and damage.

In addition, in the case of platforms carrying installations for the compression and processing of gas, the gas input and output lines are often very large in size (diameters of 900 mm and more) and contain high-energy gas at very high pressure (for example methane at 140 bars). The failure of this kind of line means an eruption of gas with initial flow rates of very high order (15 to 30,000 m³/second) and very substantial temperature drops (of the order of 100°C).

In the platform described, the volumes of the tunnels 6 and the central shaft 3 are open to the atmosphere through the top of the shaft which is fully open over the whole of its cross-section, so that the gas escapes to the atmosphere through the top of the central shaft 3; in installations of this type the shaft may constitute a shaft or chimney of substantial height (50 m and more) and a leakage taking place through it will only create a small, local superatmospheric pressure. Moreover, the superficial concrete layer at the inside of the central shaft 3 insulates the concrete reinforcing elements from the cold, avoiding any failure as a consequence of the steel being rendered brittle by the low temperature (−90°C).

In addition, this platform very much facilitates the installation of the connecting lines because, during installation and connection, the tunnels 6 and the central shaft 3 remain dry and at atmospheric pressure.

These conditions of dryness and pressure, are obtained, in accordance with one feature of the invention, by means of devices for sealing at the output of the bunch of drill pipe guide tubes, and at the inputs and outputs of the connecting pipes.

Figures 5A, 5B:
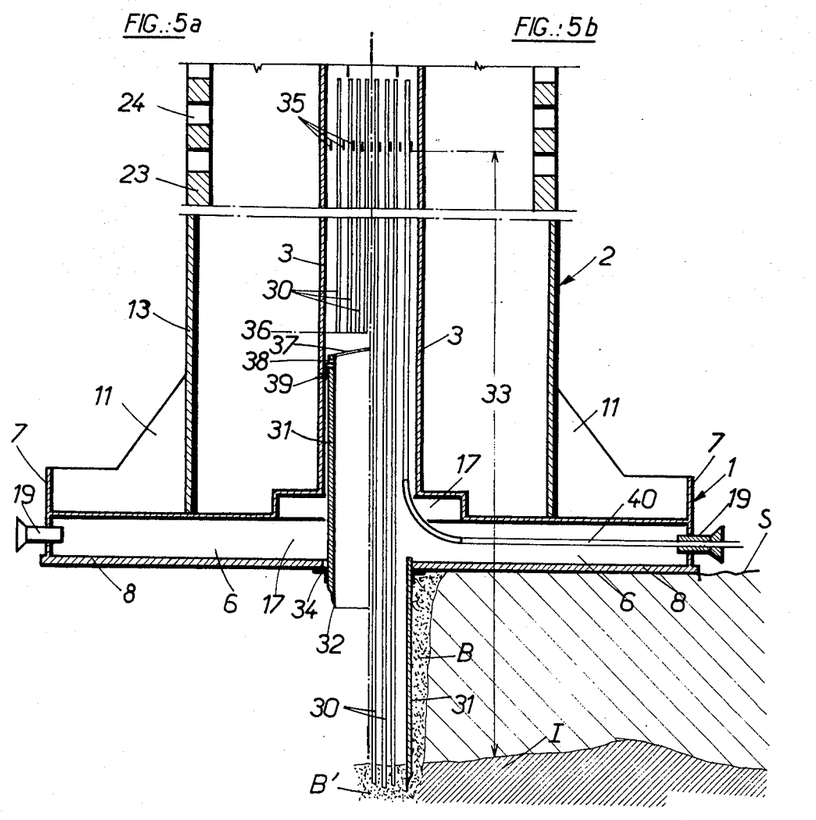
FIGS. 5a and 5b are two corresponding vertical half-sections through the bottom part of the structure, respectively when in the towing position and in the final erected position.

FIGS. 5a and 5b illustrate the arrangement of the assembly of these tubes when the installation is complete and the seals have been made.

In these figures, a skirt 31 of concrete or steel, whose external diameter is slightly less than the internal diameter of the central hollow shaft 3, has been shown. The length of the skirt is sufficient to ensure that when it is driven, like a pile, into the submarine substratum, it can reach the impermeable strata I. The skirt is cemented to the substrata by injected concrete B. The seal between the skirt 31 and the slab 8 is effected by a lip seal 34 during the sliding phase, and later by injected concrete B introduced when the sliding operation has been completed and the casing finished.

During the phase of towing the structure (see FIG. 5a) to the site of its final erection, the guides 30 are in position in the central shaft 3 where they are centered by sliding centred 35 and halted at the level 36. The skirt 31 is retracted into the shaft 3 and its top end is closed off by a panel 37 fixed to a flange 38 formed on it (31). The upward force produced by the water pressure is withstood by retractable studs 39 which transmit the force to the structure.

When the structure is deposited upon the seabed S, first of all the central shaft 3 is filled with water in order to balance the pressures at either side of the panel 37 and then water under high pressure is injected through nozzles 32 arranged around the whole of the bottom circumferences of the skirt 31, in order to excavate away the seabed beneath it. The studs 39 are then retracted and the skirt descends under its own weight. On reaching the hard substratum, it stops and concrete B (see FIG. 5b) is injected, a layer of concrete B' possibly also being placed around the lower part, this layer then being drilled through as if it were a rock layer, in order to pass the guide tubes 30. The panel 37 is dismantled after the central barrel 3 and the tunnels 6 have been pumped dry. It is stored in the chamber 17 or removed through the central shaft.

The process of fitting the guide tubes 30 is carried out in the conventional way: as the drilling operation is carried out down through the concrete layer B' and then through the stratum I, the tube is lowered down to a depth of some few tens of meters, then halted and cemented in position, whereafter drilling is continued normally.

One of the major advantages of this kind of arrangement is that the bottom portions, identified by reference numeral 33, of the tubes 30 are free in relation to the structure. The slight movements which the latter executes as a consequence of settling, therefore, introduce no risk of stresses being developed in the drill pipe extensions.

FIG. 5b illustrates highly schematically how a device 19 in accordance with the invention effects a seal at the point of leadthrough of the connecting pipes 40 at the ends of the tunnels 6, through the external wall 7 of the apron 1.

The device, shown in more detailed fashion in FIG. 6, comprises:

at the sea side M, on the one hand a watertight safety hatch 44 with a float 45 which gives it a slight positive buoyancy, and a pressure-balancing cock 46, and on the other hand a centering cone 47 which surrounds a pipe 41 in order to facilitate the introduction of a submerged pipe 43 fitted with a traction head 55. The hatch is applied in position by the water pressure and retained by a safety chain 42 attached to a cross-member 49 by means of a screwed yoke 50 and a nut 51.

Inside the pipe 41, an inflatable seal 52 as well as a traction cable 53 terminating in a hook 54 designed to cooperate with the head 55 of the pipe 43.

at the internal side, towards the tunnel 6, a watertight panel 56 bolted at 58 and equipped with a gland 57 traversed by the traction cable 53, said internal panel 56 being fitted with an air inlet cock 59 and a second water scavenge cock 60.

The operation of introducing the submerged pipe 43 is carried out in the following way:

1. Through the interior of the dry tunnel 6, an operator proceeds to remove the panel 56, to unshackle the system 42–49 retaining the external panel 44, and to set the panel 56 again.

2. A diver opens the cock 46 from the outside M, thus flooding the space 41; as soon as the pressures have balanced, the panel 44 detaches and floats to the surface behind the float 45.

3. The diver then takes the hook 54 of the traction cable 53 and attaches it to the traction head 55 of the waiting submerged pipe 43.

4. The cable 53 is tensioned by a winch (not shown) located inside the tunnel 6 and causes the pipe 43 to advance so that it engages in the centering cone 47 and enters the pipe 41 until it comes up against the internal watertight panel 56.

5. The seal 52 is inflated and snugs up in watertight fashion around the periphery of the pipe 43. The panel 56 can then be removed after having discharged the water from the pipe 41 by opening the air 59 and water scavenge 60 cocks.

6. The end of the traction head 55 is drawn towards the interior by a short distance, sufficient to facilitate its disconnection and the welding of the pipe 43 to the lines previously provided inside the tunnel 6.

7. The annular space between the pipe 43 and the pipe 41 is ridded of water by blowing in compressed air, and then injected with epoxy resin. The inflatable seal 52 has then served its purpose and can be discarded.

It should be borne in mind that in the event of a failure in the pressurized piping system below the structure, the fluid which escapes will be able to pass out freely through the shaft or chimney 3 without spreading under superatmospheric pressure beneath the structure, whereas in the conventional structures this kind of incident could cause lifting of the structure and instability under the action of the sea.

In the embodiment of FIGS. 7–10, where the elements which perform the same function as in the preceding figures, have been designated by the same reference numbers increased by 100, the central part 110 of the slab 108 closes off in watertight fashion the bottom of the shaft 103 and the tunnels 106 of the platform. The platform with its central hollow shaft 103 and its submarine tunnels 106, here again makes it possible to lower the input or output lines for petroleum products 140, down to the bottom through the central shaft 103, and then to pass them radially through the tunnels 106 which are also kept dry by a tunnel exit sealing device 119 such as that described in relation to FIG. 6.

The assembly of platform pipe connections, here again, is kept dry and protected from accidental shock loading, by the dual protection afforded by the perforated wall 123 of the cylindrical body 102 and by the strong wall of the central hollow shaft 103. These connecting lines are therefore not subjected to corrosion and can be inspected and maintained in a permanent way, thus much reducing the risks of accident and damage.

I claim:

1. An off-shore gravity-type platform for supporting a processing installation above the surface of a body of water and for housing processing components, comprising a base structure resting upon the bed of the body of water, a tower structure integrally connected to the base structure to be supported by the same and extending therefrom up to above said water surface, a deck supported on the upper end of the tower structure for supporting the processing installation, a pressure-resisting watertight hollow shaft having an open bottom end open, incorporated within the tower structure and extending from the base structure to the deck for housing said components, a pressure-resisting watertight tubular skirt having both ends open, received telescopically in the shaft, and means for driving the tubular skirt pile-like into the bed of the body of water through said wide open bottom end, to give access to an underwater layer of said bed through said shaft and said tubular skirt.

2. A platform as claimed in claim 1, in which said underwater layer is an impermeable layer.

3. A platform as claimed in claim 1, in which said driving means comprise a plurality of nozzles arranged around the whole bottom circumference of the skirt, and including means for injecting jets of pressurized fluid through the nozzles to excavate the bed beneath the skirt.

4. A platform as claimed in claim 1, in which the upper end of the shaft is open to the atmosphere.

5. A platform as claimed in claim 1, in which the hollow shaft is arranged centrally of the tower structure, and the tower structure comprises solid peripheral portions to protect the hollow shaft against shocks.

6. A platform as claimed in claim 1, in which the hollow shaft is integrally connected to the base structure, and the deck is supported on the hollow shaft and the tower structure.

7. A platform as claimed in claim 1, in which said components include piping for connection to an underwater pipe line, comprising at least one pressure-resisting watertight tunnel incorporated in the base structure, communicating with the hollow shaft and extending radially therefrom to an end wall having an outer surface exposed to the water body, and watertight lead-through means in the end wall for connecting said piping to said pipe line through said end wall.

8. A platform as claimed in claim 7, in which said pipe line comprises a pipe section having a free end and a traction head fitted at said free end, said watertight leadthrough means comprising a passage through the end wall and including a tubular sleeve having a cross-section slightly larger than the cross-section of said pipe section, the sleeve having an outer end adjacent said outer surface and an inner end, a detachable pressure-hatch for closing off said outer end sealingly, a detachable watertight panel for closing off said inner end sealingly and having an opening therethrough, a traction cable passing slidingly through said opening, means for sealing said opening around said traction cable, an orifice through the pressure-hatch and a cock operable from the body of water to close the orifice and to open the same to flood the sleeve and equalize pressures within and without the same in order to allow removal of the hatch, means for connecting the traction cable to the traction head, traction means in the tunnel for drawing the traction cable, and means for removing the detachable panel.

9. A platform as claimed in claim 8, comprising inflatable seal means in the sleeve for sealing the same around the pipe section, a water scavenge cock in the watertight panel, and means for blowing compressed gas into the sleeve to force the water therefrom.

10. A platform as claimed in claim 8, comprising a centering cone at the outer end of the sleeve for guiding the pipe section therein.

11. An off-shore gravity-type platform for supporting a processing installation above the surface of a body of water and for housing processing components including piping for connection to an underwater pipe line, comprising a base structure resting upon the bed of the body of water, a tower structure integrally connected to the base structure to be supported by the same and extending therethrough up to above said water surface, a deck supported on the upper end of the tower structure for supporting the processing installation, a pressure-resisting watertight hollow shaft incorporated within the tower structure and extending through the base structure to the deck for housing said components, at least one pressure-resisting water-tight tunnel incorporated in the base structure, communicating with the hollow shaft and extending radially therefrom to an end wall having an outer surface exposed to the water body, and watertight lead-through means in the end wall for connecting said piping to said pipe line through said end wall.

12. A platform as claimed in claim 11, in which the hollow shaft is integrally connected to the base structure, and the deck is supported on the hollow shaft and the tower structure.

13. A platform as claimed in claim 11, in which the upper end of the hollow shaft is wide open to the atmosphere.

14. A platform as claimed in claim 11, in which the hollow shaft is arranged centrally of the tower structure, and the tower structure comprises solid peripheral portions to protect the hollow shaft against shocks.

15. A platform as claimed in claim 11, in which the bottom end of the hollow shaft is open to give access to the bed of the water body through said bottom end.

16. A platform as claimed in claim 15, in which said pipeline comprises a pipe section having a free end and a traction head fitted at said free end, said watertight leadthrough means comprising a passage through the end wall, and including a tubular sleeve having a cross-section slightly larger than the cross-section of said pipe section, the sleeve having an outer end adjacent said outer surface and an inner end, a detachable pressure-hatch for closing off said outer end sealingly, a detachable watertight panel for closing off said inner end sealingly and having an opening therethrough, a traction cable passing slidingly through said opening, means for sealing said opening around said traction cable, an orifice through the pressure-hatch and a cock operable from the body of water to close the orifice and to open the same to flood the sleeve and equalize pressures within and without the same in order to allow removal of the hatch, means for connecting the traction cable to the traction head, traction means in the tunnel for drawing the traction cable, and means for removing the detachable panel.

17. A platform as claimed in claim 16, comprising inflatable seal means in the sleeve for sealing the same around the pipe section, a water scavenge cock in the watertight panel, and means for blowing compressed gas into the sleeve to force the water therefrom.

18. A platform as claimed in claim 16, comprising a centering cone at the outer end of the sleeve for guiding the pipe section therein.

19. A platform as claimed in claim 11, comprising a pressure-resisting watertight tubular skirt having both ends wide open and received telescopically in the shaft, and means for driving the tubular skirt pile-like into the bed of the body of water through said wide open bottom end, to give access to an underwater layer of said bed through said shaft and said tubular skirt.

20. A platform as claimed in claim 19, in which said underwater layer is an impermeable layer.

21. A platform as claimed in claim 19, in which said driving means comprise a plurality of nozzles arranged around the whole bottom circumference of the skirt, and means for injecting jets of pressurized fluid through the nozzles to excavate the bed beneath the skirt.

* * * * *

UNITED STATES PATENT AND TRADEMARK OFFICE
CERTIFICATE OF CORRECTION

PATENT NO. : 3,938,343
DATED : February 17, 1976
INVENTOR(S) : Jacques Edouard Lamy It is certified that error appears in the above-identified patent and that said Letters Patent are hereby corrected as shown below:

Column 2, line 10, change "or" to --on--;

Column 3, line 57, after "the" insert --lobes--;

Column 5, line 43, change "centred" to --guides--;

Claim 1, line 11, after "end" delete "open".

Signed and Sealed this

Thirteenth Day of July 1976

[SEAL]

Attest:

RUTH C. MASON
*Attesting Officer*

C. MARSHALL DANN
*Commissioner of Patents and Trademarks*